US012341278B2

(12) United States Patent
Nakamura

(10) Patent No.: US 12,341,278 B2
(45) Date of Patent: Jun. 24, 2025

(54) CONNECTOR MOUNTABLE ON BOARD AND ASSEMBLY COMPRISING THE CONNECTOR AND THE BOARD

(71) Applicant: Japan Aviation Electronics Industry, Limited, Tokyo (JP)

(72) Inventor: Keisuke Nakamura, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 370 days.

(21) Appl. No.: 18/093,911

(22) Filed: Jan. 6, 2023

(65) Prior Publication Data

US 2023/0261402 A1 Aug. 17, 2023

(30) Foreign Application Priority Data

Feb. 17, 2022 (JP) ................................ 2022-022907

(51) Int. Cl.
*H01R 12/71* (2011.01)
*H01R 13/24* (2006.01)
*H01R 13/405* (2006.01)

(52) U.S. Cl.
CPC ......... *H01R 12/716* (2013.01); *H01R 12/714* (2013.01); *H01R 13/2407* (2013.01); *H01R 13/405* (2013.01)

(58) Field of Classification Search
CPC ....... H01R 12/00; H01R 12/716; H01R 12/52
USPC ........................................................... 439/74
See application file for complete search history.

(56) References Cited

U.S. PATENT DOCUMENTS

| | | | | |
|---|---|---|---|---|
| 10,516,228 | B2 | 12/2019 | Takenaga et al. | |
| 10,651,106 | B2 * | 5/2020 | Wu | H01L 23/32 |
| 2017/0359905 | A1 * | 12/2017 | Hsu | H01R 13/405 |

FOREIGN PATENT DOCUMENTS

| | | |
|---|---|---|
| JP | 2019-046670 A | 3/2019 |
| JP | 2021-068608 A | 4/2021 |

* cited by examiner

*Primary Examiner* — Phuong K Dinh
(74) *Attorney, Agent, or Firm* — Collard & Roe, P.C.

(57) ABSTRACT

A connector is mountable on a board and is mateable with a mating connector which comprises a mating terminal. The connector comprises a terminal held by a holding member. The terminal has a first support portion which is resiliently deformable, a primary contact point supported by the first support portion, a second support portion which extends from the primary contact point and is resiliently deformable, and a pressed portion supported by the second support portion. The pressed portion is movable in an upper-lower direction (Z-direction) and a width direction (Y-direction). When the connector is mated with the mating connector, the primary contact point is brought into contact with the mating terminal and is moved in the width direction. When the connector is under a mated state where the connector is mated with the mating connector, the pressed portion is pressed against the board in the upper-lower direction.

8 Claims, 10 Drawing Sheets

CONNECTOR MOUNTABLE ON BOARD AND ASSEMBLY COMPRISING THE CONNECTOR AND THE BOARD

CROSS REFERENCE TO RELATED APPLICATIONS

This application is based on and claims priority under 35 U.S.C. § 119 to Japanese Patent Application No. JP 2022-022907 filed Feb. 17, 2022, the content of which is incorporated herein in its entirety by reference.

BACKGROUND OF THE INVENTION

This invention relates to a connector configured to be mounted on a board and an assembly including this connector.

For example, this type of connector is disclosed in JP2019-46670A (Patent Document 1), the content of which is incorporated herein by reference.

Referring to FIG. 19, Patent Document 1 discloses a connector 90 which is a so-called on-board connector configured to be mounted on a board 98. The connector 90 comprises a housing (holding member) 92 and a large number of terminals 94. The terminals 94 are arranged in a pitch direction (X-direction) and are held by the holding member 92. Each of the terminals 94 has a fixed portion 942. When the connector 90 is mounted on the board 98, the fixed portions 942 are soldered to conductive pads (not shown) of the board 98, respectively, and thereby the connector 90 is fixed on the board 98.

In an instance where a distance between the pads is short, two of the terminals 94 adjacent to each other might be short-circuited via solder. Therefore, every two of the pads adjacent to each other should be arranged so that they are apart from each other by a predetermined distance. The distance (pitch) between two of the terminals 94 adjacent to each other cannot made smaller than this predetermined distance. Thus, according to the existing on-board connector, there is a limit to reduce the pitch between the terminals.

SUMMARY OF THE INVENTION

It is therefore an object of the present invention to provide an assembly which includes a connector configured to be mounted on a board and has a structure suitable to reduce the pitch between terminals.

An aspect of the present invention provides an assembly comprising a board, a connector and a fixation mechanism. The board has a principal surface. The principal surface is formed with a conductive pad. The connector is mountable on the principal surface and is fixable on the principal surface by the fixation mechanism. The connector is mateable with a mating connector, which comprises a mating terminal, in an upper-lower direction intersecting with the principal surface. The connector comprises a holding member and a terminal. The holding member holds the terminal. The terminal has a first support portion, a primary contact point, a second support portion and a pressed portion. The first support portion is resiliently deformable. The primary contact point is supported by the first support portion and is movable in a width direction perpendicular to the upper-lower direction. When the connector is mated with the mating connector, the primary contact point is brought into contact with the mating terminal and is moved in the width direction. The second support portion extends from the primary contact point and is resiliently deformable. The pressed portion is supported by the second support portion and is movable in the upper-lower direction and the width direction. When the connector is under a mated state where the connector is mated with the mating connector, the pressed portion is pressed against the conductive pad in the upper-lower direction.

Another aspect of the present invention provides a connector mateable with a mating connector, which comprises a mating terminal, in an upper-lower direction intersecting with a board on which the connector is mountable. The connector comprises a holding member and a terminal. The holding member holds the terminal. The terminal has a first support portion, a primary contact point, a second support portion and a pressed portion. The first support portion is resiliently deformable. The primary contact point is supported by the first support portion and is movable in a width direction perpendicular to the upper-lower direction. When the connector is mated with the mating connector, the primary contact point is brought into contact with the mating terminal and is moved in the width direction. The second support portion extends from the primary contact point and is resiliently deformable. The pressed portion is supported by the second support portion and is movable in the upper-lower direction and the width direction. When the connector is mounted on the board and is under a mated state where the connector is mated with the mating connector, the pressed portion is pressed against the board in the upper-lower direction.

The connector of an aspect of the present invention can be fixed on the board by the fixation mechanism such as an additional terminal, a screw and a holddown. The terminal can be connected to the conductive pad not by soldering but by being merely pressed against the conductive pad. According to this connection method, two of the conductive pads adjacent to each other can be arranged at positions extremely close to each other, and thereby the terminals can be arranged in a narrow pitch. Thus, an aspect of the present invention provides an assembly which includes a connector configured to be mounted on a board and has a structure suitable to reduce the pitch between terminals.

An appreciation of the objectives of the present invention and a more complete understanding of its structure may be had by studying the following description of the preferred embodiment and by referring to the accompanying drawings.

Figure 1:
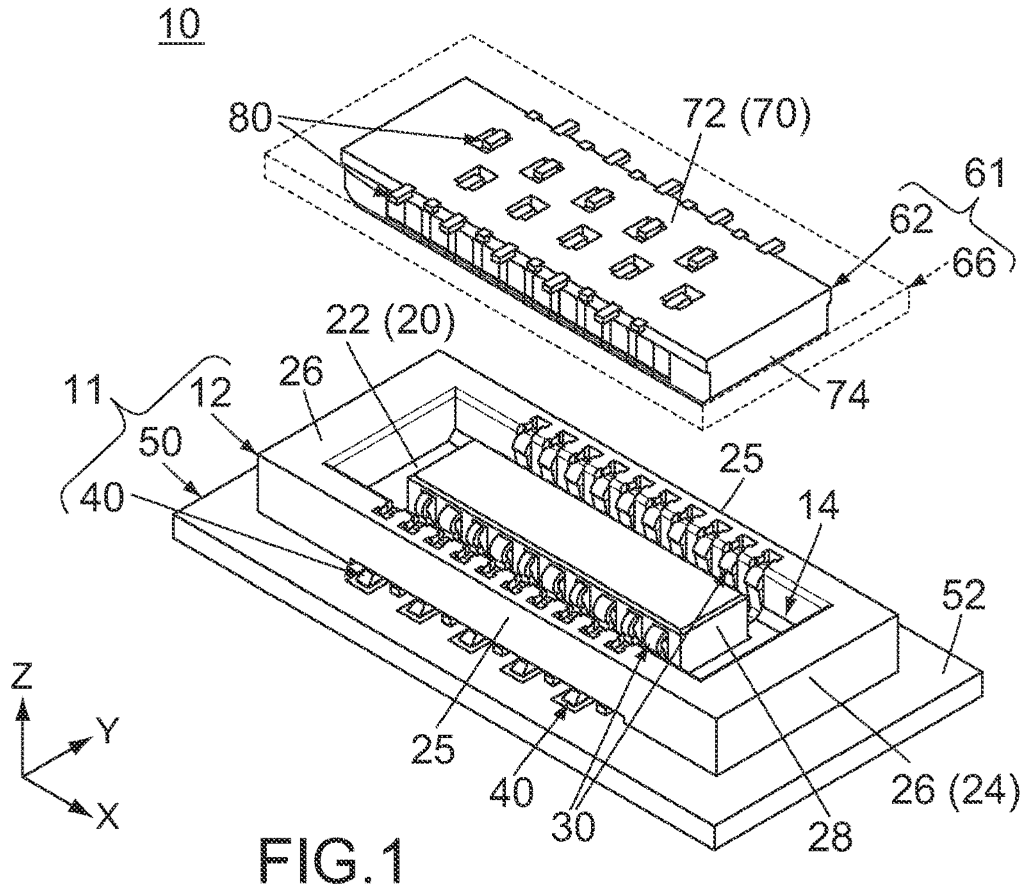
FIG. 1 is a perspective view showing a connection device which includes an assembly according to an embodiment of the present invention and a mating assembly, wherein a connector of the assembly is under a separated state where the connector is separated from a mating connector of the mating assembly, and an outline of a mating board on which the mating connector is mounted is illustrated with dashed line.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 2:
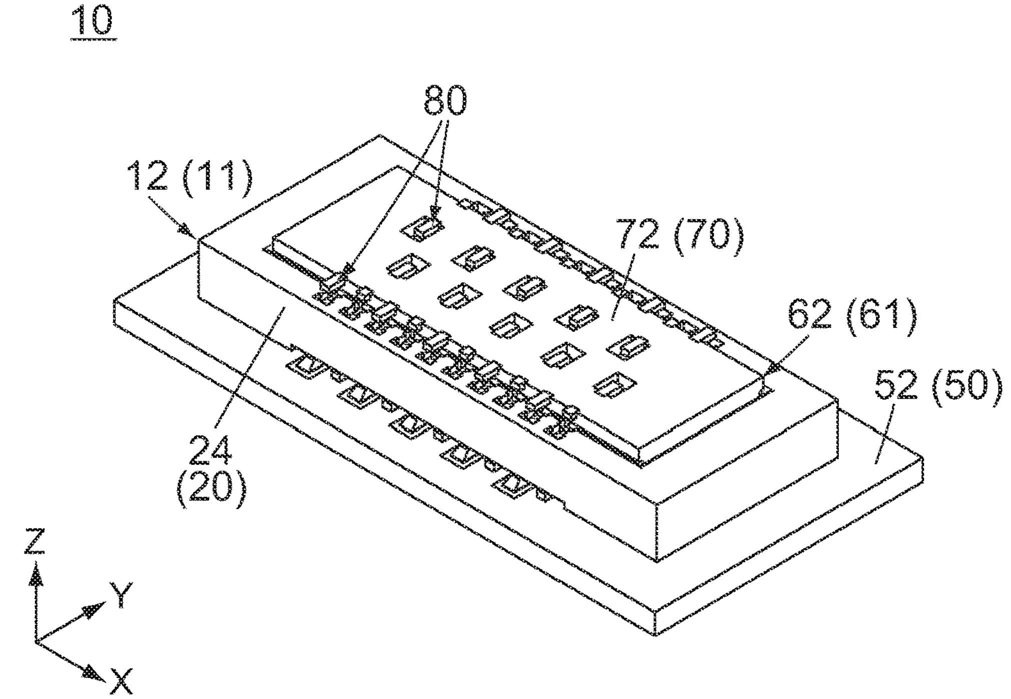
FIG. 2 is a perspective view showing the connection device of FIG. 1, wherein the connector is under a mated state where the connector is mated with the mating connector.

Referring to FIGS. 1 and 2, a connection device 10 according to an embodiment of the present invention comprises an assembly 11 and a mating assembly 61. The assembly 11 and the mating assembly 61 are connectable to each other along an upper-lower direction. The upper-lower direction of the present embodiment is the Z-direction. In the present embodiment, "upward" means the positive Z-direction, and "downward" means the negative Z-direction. For example, the assembly 11 and the mating assembly 61 are incorporated in an electronic device (not shown). However, the present invention is not limited thereto but is applicable to various connection devices 10.

Hereafter, explanation will be made about the mating assembly 61 of the present embodiment.

Figure 6:
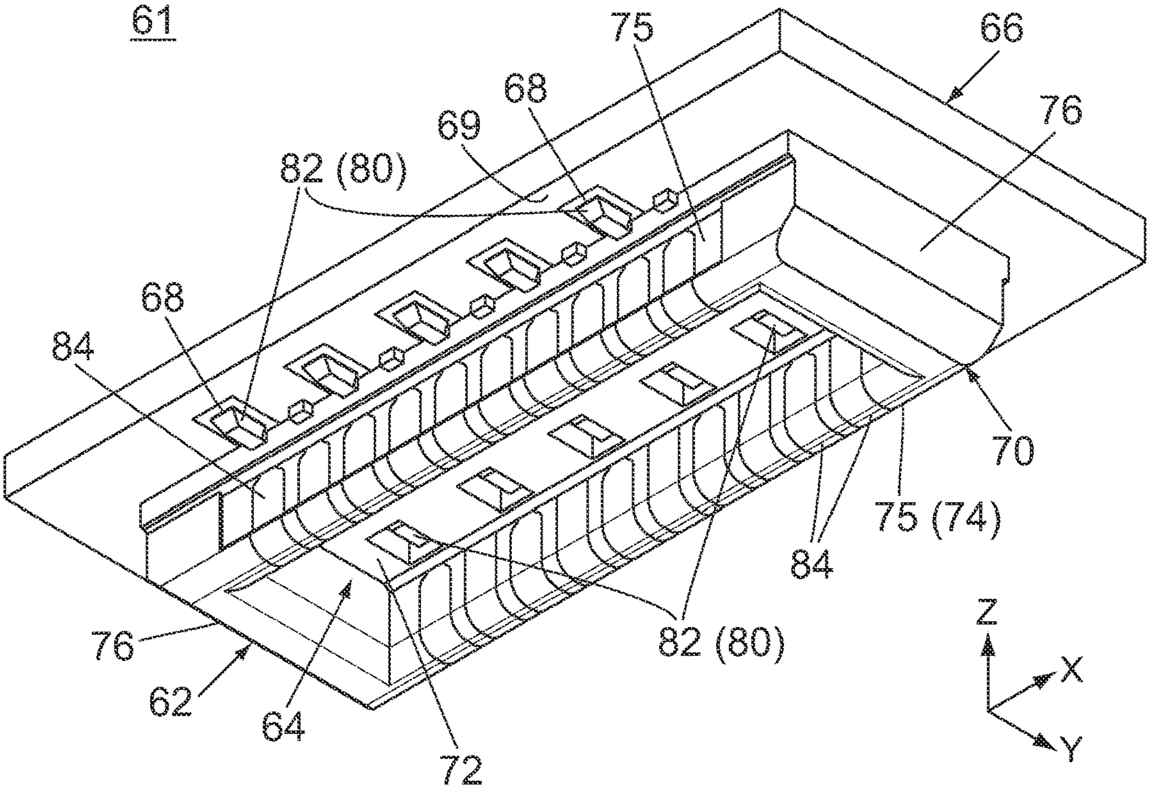
FIG. 6 is a perspective view showing the mating assembly of the connection device of FIG. 1.
Figure 7:
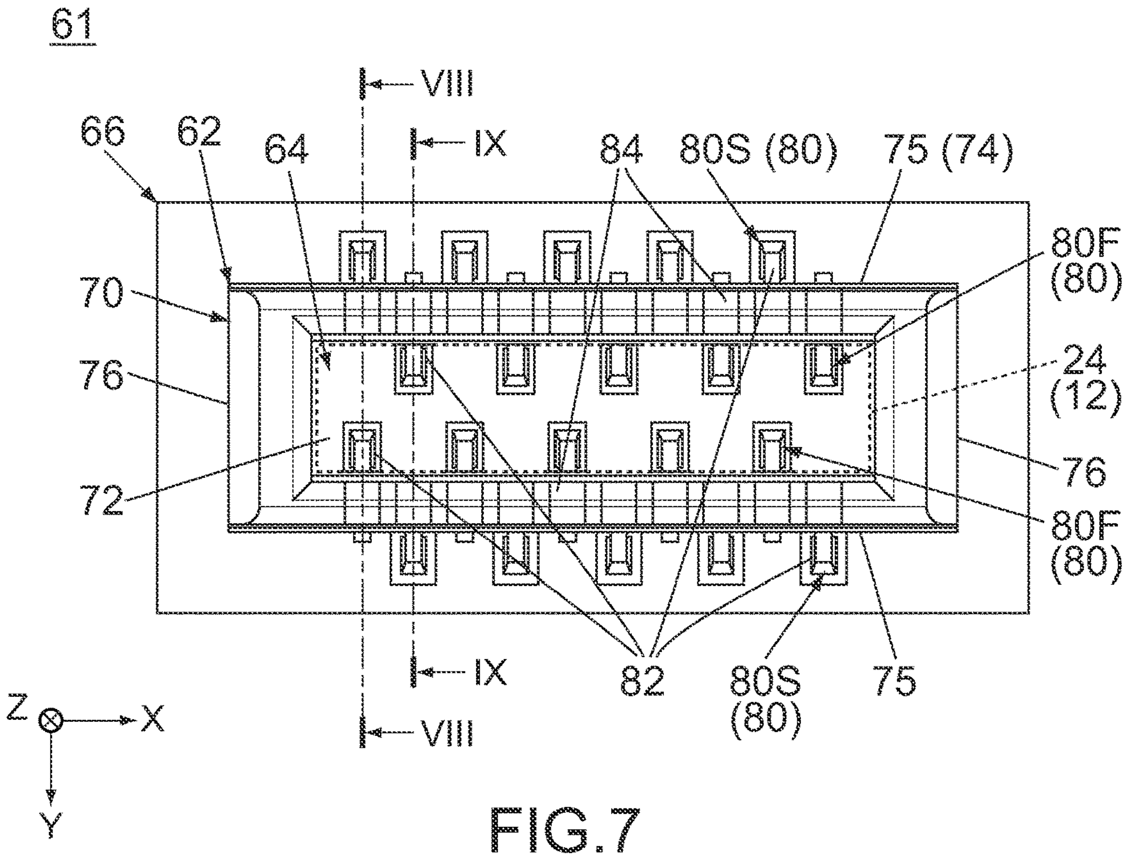
FIG. 7 is a plan view showing the mating assembly of FIG. 6, wherein a part of an outline of the connector under the mated state is illustrated with dashed line.

As shown in FIGS. 1, 6 and 7, the mating assembly 61 of the present embodiment comprises a mating board 66 and a mating connector 62. The mating connector 62 is mounted and fixed on the mating board 66. However, the present invention is not limited thereto. For example, the mating assembly 61 may further comprise another member in addition to the aforementioned members.

Referring to FIGS. 6 and 7, the mating connector 62 of the present embodiment comprises a mating holding member 70 made of insulator and two or more mating terminals 80 each made of conductor. The number of the mating terminals 80 of the present embodiment is twenty. The mating connector 62 is formed with a mating receiving portion 64. The mating receiving portion 64 is a space recessed upward. The mating receiving portion 64 opens downward. However, the present invention is not limited thereto. For example, the mating connector 62 may comprise only one of the mating terminals 80. The mating connector 62 may further comprise another member in addition to the aforementioned members.

The mating holding member 70 of the present embodiment has a base portion 72 and a peripheral wall 74. The base portion 72 is located at an upper end of the mating holding member 70 in the upper-lower direction. The peripheral wall 74 extends downward from the base portion 72 and encloses the mating receiving portion 64 in a horizontal plane (XY-plane) perpendicular to the upper-lower direction. The peripheral wall 74 has two side walls 75 and two coupling walls 76. The two side walls 75 extend in parallel to each other along a pitch direction perpendicular to the upper-lower direction. The pitch direction of the present embodiment is the X-direction. The two coupling walls 76 extend in parallel to each other along a width direction perpendicular to both the pitch direction and the upper-lower direction. The width direction of the present embodiment is the Y-direction. Each of the coupling walls 76 couples the two side walls 75 to each other in the width direction.

The mating holding member 70 of the present embodiment is a unitary member having the aforementioned structure. However, the present invention is not limited thereto. For example, the mating holding member 70 may be formed of a plurality of members combined together.

Referring to FIG. 7, the mating terminals 80 of the present embodiment include two or more first terminals 80F and two or more second terminals 80S. In the present embodiment, the number of the first terminals 80F is ten, and the number of the second terminals 80S is ten. As described above, the mating terminals 80 include two types of the mating terminals 80. The first terminal 80F and the second terminal 80S are slightly different from each other in their shapes but have structures same as each other.

Figure 8:
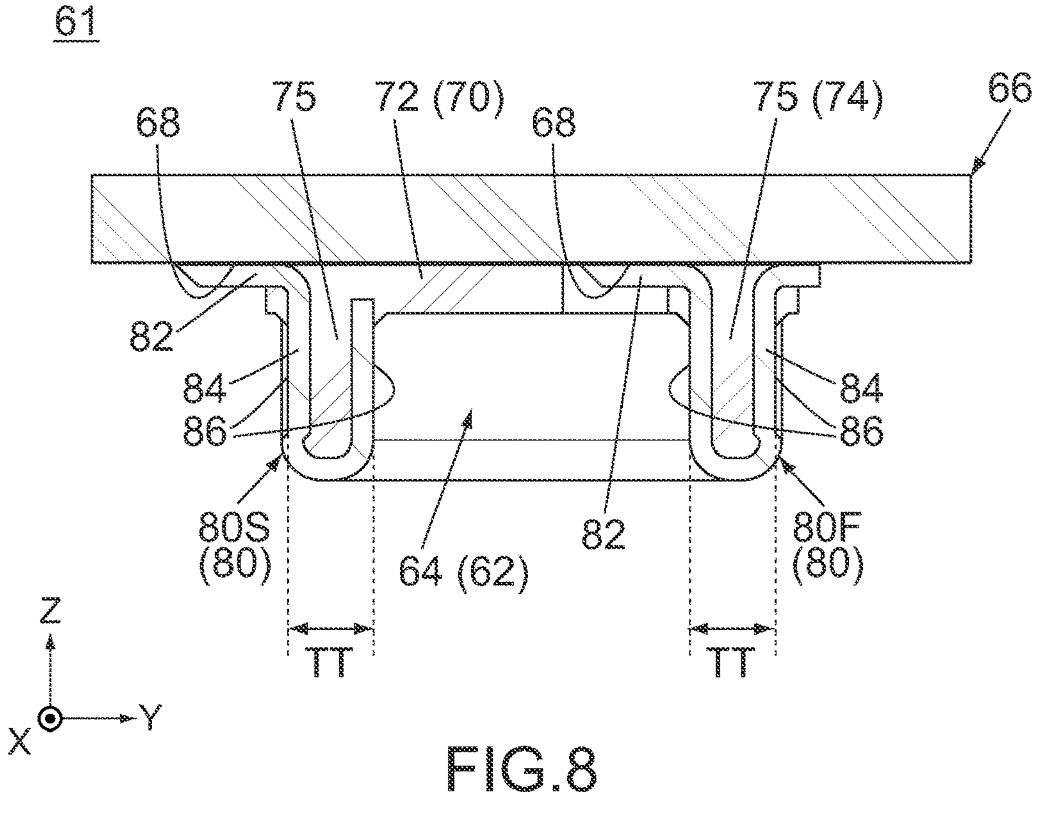
FIG. 8 is a cross-sectional view showing the mating assembly of FIG. 7, taken along line VIII-VIII.
Figure 9:
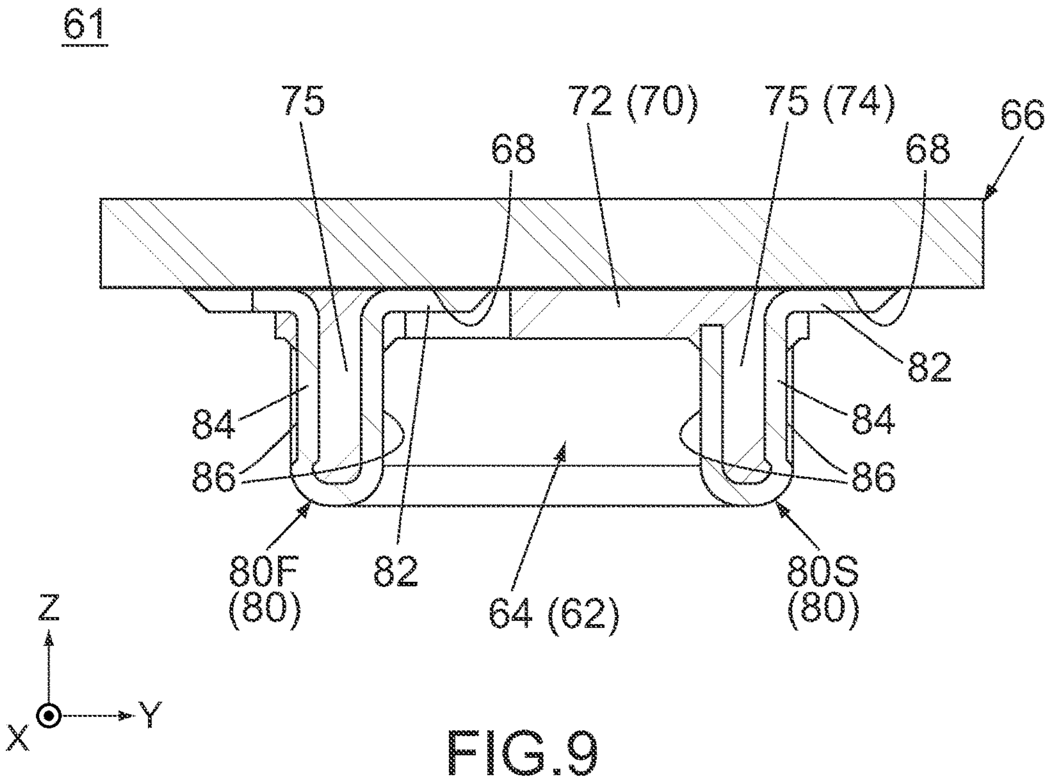
FIG. 9 is a cross-sectional view showing the mating assembly of FIG. 7, taken along line IX-IX.

Referring to FIGS. 8 and 9, each of the mating terminals 80 of the present embodiment is a single metal plate with bends. Each of the mating terminals 80 has a mating fixed portion 82 and a mating contact portion 84. Each of the mating fixed portions 82 is located at an upper end of the mating terminal 80 and extends along the width direction. Each of the mating contact portions 84 extends downward from the mating fixed portion 82. Each of the mating contact portions 84 has a U-like shape in a perpendicular plane (YZ-plane) perpendicular to the pitch direction. This U-like shape has opposite surfaces in the width direction which work as two contact surfaces 86 configured to be electrically connected with a connector 12 (see FIG. 1).

Each of the mating terminals 80 of the present embodiment has the aforementioned structure. However, the present invention is not limited thereto. For example, the shape of the first terminal 80F and the shape of the second terminal 80S may be same as each other. In other words, the mating terminals 80 may include only one type of the mating terminals 80. Instead, the mating terminals 80 may include three or more types of the mating terminals 80. Moreover, the structure of each of the mating terminals 80 is not specifically limited. For example, each of the mating terminals 80 may have only one of the contact surfaces 86.

Referring to FIG. 7, the mating terminals 80 of the present embodiment are divided into two rows in the width direction. In other words, the mating connector 62 comprises two mating terminal rows. In each of the mating terminal rows, five of the first terminal 80F and five of the second terminals 80S are alternately arranged along the pitch direction. The first terminals 80F and the second terminals 80S of the two mating terminal rows are arranged so that they have 2-fold rotational symmetry with respect to an axis in parallel to the upper-lower direction. The first terminals 80F of one of the mating terminal rows and the second terminals 80S of a remaining one of the mating terminal rows are arranged side by side in the width direction, respectively. The mating terminals 80 of the present embodiment are arranged as described above. However, the arrangement of the mating terminals 80 of the present invention is not specifically limited.

The two mating terminal rows are attached to the two side walls 75, respectively. Each of the mating contact portions 84 of the present embodiment is insert-molded in the side wall 75 and is thereby held by the mating holding member 70. Referring to FIGS. 8 and 9, for each of the mating contact portions 84, one of the two contact surfaces 86 is exposed outward from the side wall 75 in the width direction, and a remaining one of the two contact surfaces 86 is exposed in the mating receiving portion 64. However, the present invention is not limited thereto. For example, each of the mating contact portions 84 may be press-fit into the side wall 75.

Referring to FIG. 7, the mating fixed portions 82 of the mating terminals 80 are divided into four rows in the width direction. Two of the four rows include only the mating fixed portions 82 of the first terminals 80F, and remaining two of the four rows include only the mating fixed portions 82 of the second terminals 80S. When the mating connector 62 is seen along the upper-lower direction, two rows of the mating fixed portions 82 of the first terminals 80F are located inside the peripheral wall 74, and two rows of the mating fixed portions 82 of the second terminals 80S are located at opposite outside positions of the peripheral wall 74 in the width direction, respectively. In each of the four rows, two or more of the mating fixed portions 82 are arranged in a line in the pitch direction. More specifically, in each of the four rows, five of the mating fixed portions 82 are arranged in a line in the pitch direction. The mating fixed portions 82 of the present embodiment are arranged as described above. However, the arrangement of the mating fixed portions 82 of the present invention is not specifically limited.

Figure 10:
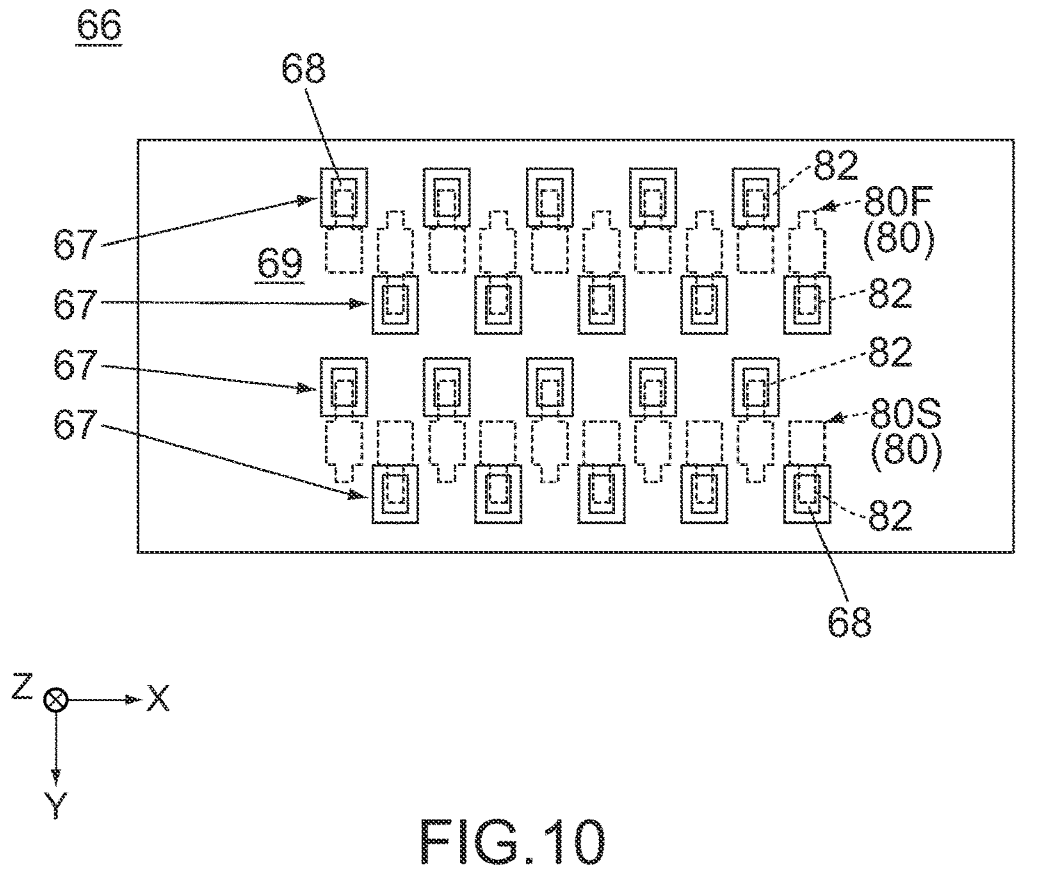
FIG. 10 is a plan view showing the mating board of the mating assembly of FIG. 6, wherein outlines of mating terminals are illustrated with dashed line.

Referring to FIG. 10, the mating board 66 of the present embodiment has a lower surface which is provided with two or more mating conductive pads 68 each made of conductor and a mating resist 69 made of insulator. More specifically, the lower surface of the mating board 66 is provided with twenty of the mating conductive pads 68.

The mating conductive pads 68 are provided so as to correspond to the mating fixed portions 82 of the mating terminals 80, respectively. The mating conductive pads 68 are divided into four mating pad rows 67 in the width direction. In each of the mating pad rows 67, two or more of the mating conductive pads 68 are arranged along the pitch direction. According to the present embodiment, the number of the mating conductive pads 68 in each of the mating pad rows 67 is five. When the mating connector 62 (FIG. 7) is mounted on the mating board 66, the mating fixed portions 82 of the four rows are fixed on and connected to the mating conductive pads 68 of the four mating pad rows 67 via soldering, respectively. As a result, the mating connector 62 is fixed on the mating board 66 and is electrically connected with the mating board 66.

The mating resist 69 surrounds the mating conductive pads 68 in the XY-plane and prevents the mating fixed portions 82 from being short-circuited upon soldering.

The mating board 66 of the present embodiment is a rigid circuit board having rigidity and has the aforementioned structure. However, the present invention is not limited thereto. For example, the mating board 66 may be an easily bendable flexible printed circuit (FPC). In this instance, the mating board 66 may be reinforced by a reinforcement plate (not shown).

Hereafter, explanation will be made about the assembly 11 (see FIG. 1) of the present embodiment.

Referring to FIG. 1, the assembly 11 of the present embodiment comprises a board 50, the connector 12 and a fixation mechanism 40. The connector 12 is mountable on the board 50. In detail, the board 50 has a principal surface 52. The connector 12 is mountable on the principal surface 52. The connector 12 is fixable on the principal surface 52 by the fixation mechanism 40. The assembly 11 of the present embodiment comprises only the aforementioned members. However, the present invention is not limited thereto. For example, the assembly 11 may further comprise another member in addition to the aforementioned members.

Referring to FIGS. 1 and 2, the principal surface 52 of the present embodiment is an upper surface of the board 50 and is a planar surface extending along the XY-plane. The connector 12 of the present embodiment is mateable with the mating connector 62, which comprises the mating terminals 80, in the upper-lower direction perpendicular to the principal surface 52. However, the present invention is not limited thereto. For example, the principal surface 52 may be a planar surface oblique to the XY-plane. Considering this arrangement, the connector 12 may be mateable with the mating connector 62, which comprises the mating terminals 80, in the upper-lower direction intersecting with the board 50 on which the connector 12 is mountable. Thus, the connector 12 may be mateable with the mating connector 62, which comprises the mating terminals 80, in the upper-lower direction intersecting with the principal surface 52.

As described above, each of the connector 12 and the mating connector 62 of the present embodiment is a so-called on board-connector. The connector 12 is a receptacle, and the mating connector 62 is a plug. However, the present invention is not limited thereto but is applicable to various connectors.

Figure 14:
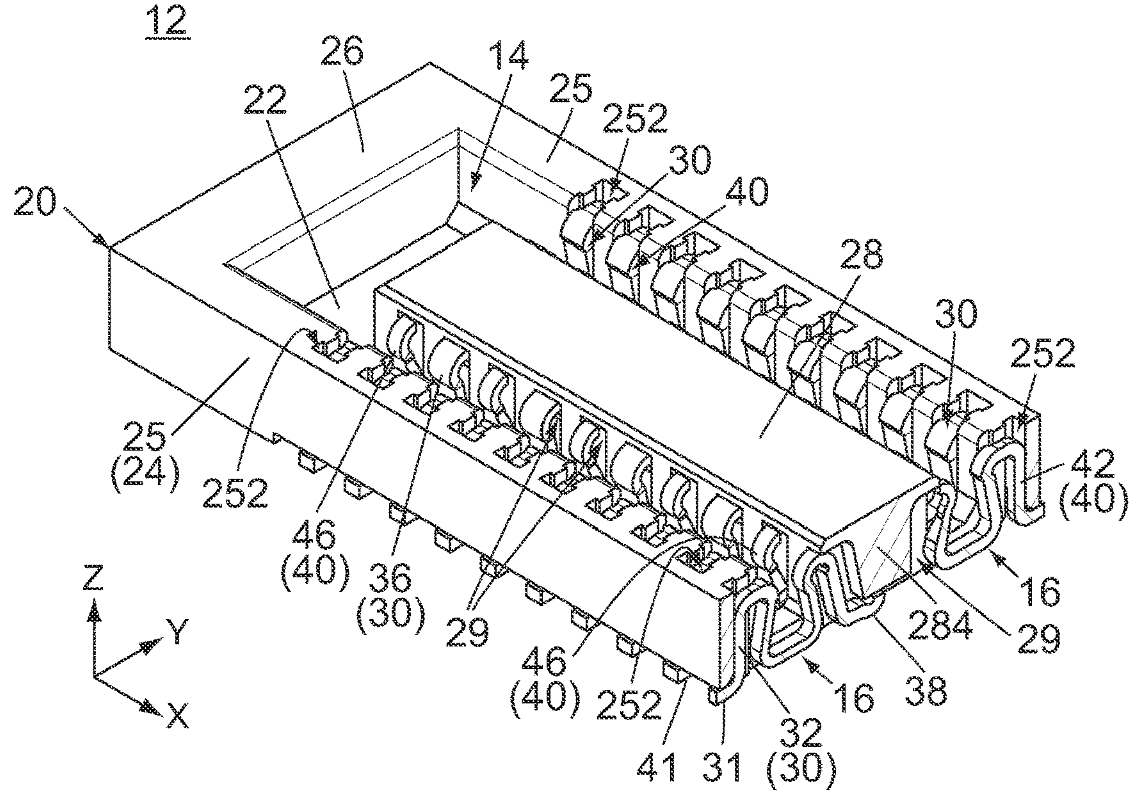
FIG. 14 is a partially cut-away, perspective view showing the connector of the assembly of FIG. 11.
Figure 15:
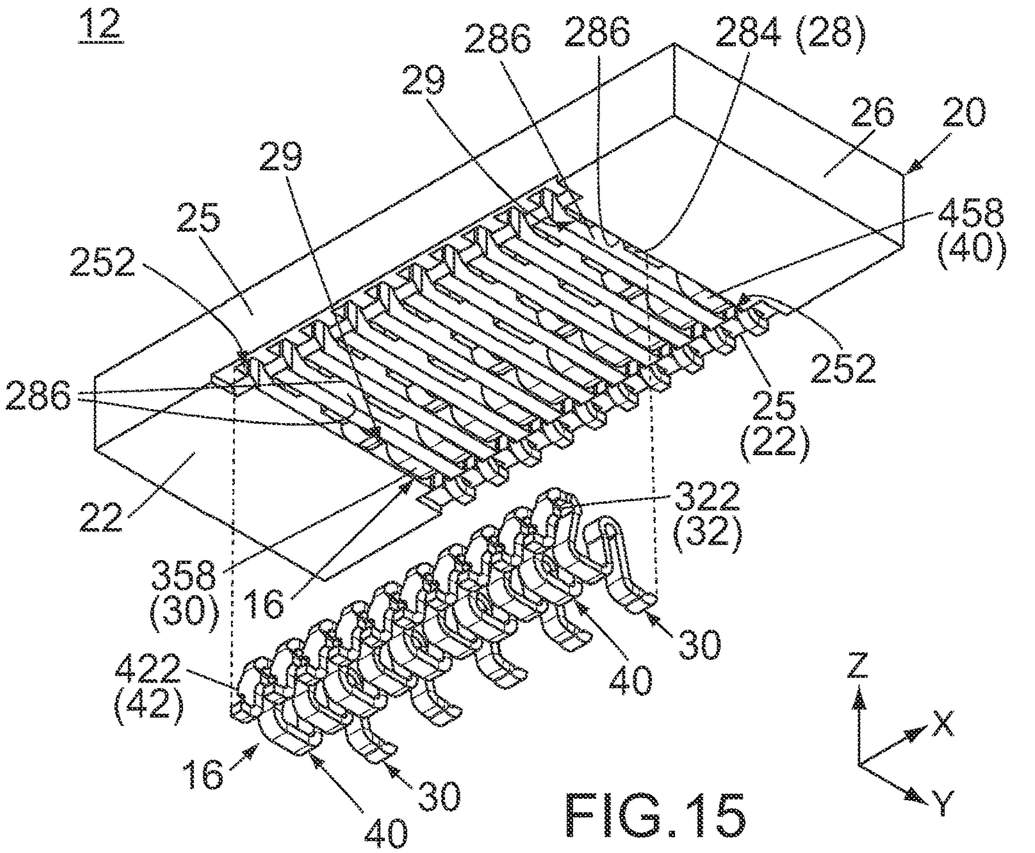
FIG. 15 is a perspective view showing the connector of FIG. 14, wherein one of two terminal rows is attached to a holding member of the connector, while a remaining one of the terminal rows is not attached.

Referring to FIGS. 1, 14 and 15, the connector 12 of the present embodiment comprises a holding member 20 made of insulator, two or more terminals 30 each made of conductor and two or more additional terminals 40 each made of conductor. In the present embodiment, the number of the terminals 30 is ten, and the number of the additional terminals 40 is ten. The additional terminals 40 work as the fixation mechanism 40. The connector 12 is formed with a receiving portion 14. The receiving portion 14 is a space recessed downward and opens upward. However, the present invention is not limited thereto. For example, the connector 12 may comprise only one of the terminals 30. The additional terminals 40 may be provided as necessary. Instead, the connector 12 may further comprise another member in addition to the aforementioned members.

Referring to FIGS. 14 and 15, the holding member 20 of the present embodiment has a bottom portion 22, an outer wall 24 and an island-like portion 28. The bottom portion 22 is located at a lower end of the holding member 20. The outer wall 24 extends upward from the bottom portion 22 and encloses the receiving portion 14 in the XY-plane. The island-like portion 28 is located at the middle of the receiving portion 14 in the XY-plane. The island-like portion 28 projects upward from the bottom portion 22 and extends along the pitch direction. The outer wall 24 has two side portions 25 and two end walls 26. The two side portions 25 extend in parallel to each other along the pitch direction. The two end walls 26 extend in parallel to each other along the width direction. Each of the end walls 26 couples the two side portions 25 to each other in the width direction.

The holding member 20 of the present embodiment is a unitary member having the aforementioned structure. However, the present invention is not limited thereto. For example, the holding member 20 may be formed of a plurality of members combined together.

Referring to FIG. 15, the terminals 30 of the present embodiment have shapes same as each other. Each of the terminals 30 is a single metal plate with bends. However, the present invention is not limited thereto. For example, the terminals 30 may have shapes different from each other. Each of the terminals 30 may be formed of a plurality of members joined together.

Hereafter, explanation will be made about a structure of one of the terminals 30 of the present embodiment. The explanation described below is applicable to each of the terminals 30.

Figure 16:
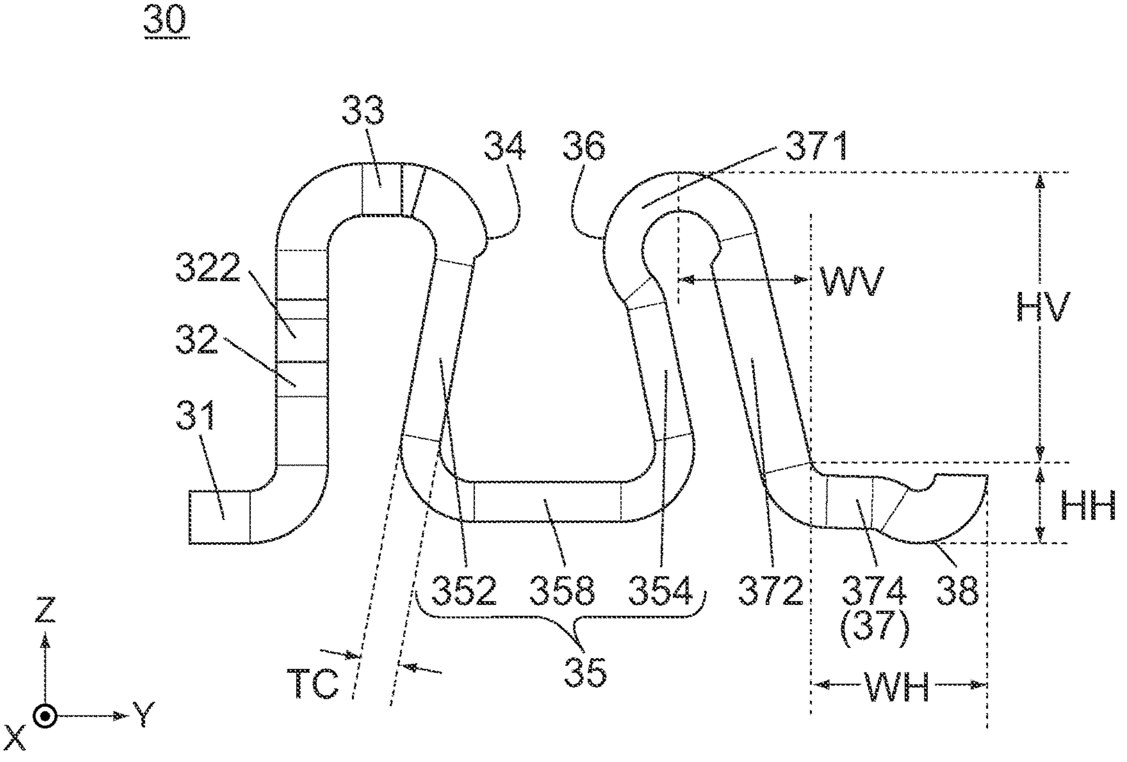
FIG. 16 is a side view showing one of the terminals of the terminal rows of FIG. 15.

Referring to FIG. 16, the terminal 30 of the present embodiment has a lower end portion 31, a held portion 32, a coupling portion 33, an auxiliary contact point 34, a first support portion 35, a primary contact point 36, a second support portion 37 and a pressed portion 38.

The lower end portion 31 is located at a lower end of the terminal 30 and extends along the width direction. The held portion 32 extends upward from an end of the lower end portion 31 in the width direction. The held portion 32 is formed with two press-fit projections 322 (see FIG. 15) which project outward from opposite sides of the held portion 32 in the pitch direction, respectively. The coupling portion 33 extends along the width direction from an upper end of the held portion 32 and extends away from the lower end portion 31 in the width direction. The auxiliary contact point 34 is provided on an end of the coupling portion 33 in the width direction. Thus, the coupling portion 33 couples the held portion 32 and the auxiliary contact point 34 to each other in the width direction. The auxiliary contact point 34 projects away from the lower end portion 31 in the width direction.

The first support portion 35 extends from the auxiliary contact point 34 and extends away from the lower end portion 31 in the width direction. The primary contact point 36 is provided on an end of the first support portion 35 in the width direction. The first support portion 35 is resiliently deformable. The primary contact point 36 is supported by the first support portion 35 and is movable mainly in the YZ-plane in accordance with a resilient deformation of the first support portion 35. The first support portion 35 of the present embodiment has a U-like shape and is resiliently deformed easily.

In detail, the first support portion 35 has an outer arm 352, a bottom arm 358 and an inner arm 354. The bottom arm 358 is located at a lower end of the first support portion 35 and extends along the width direction. The outer arm 352 extends downward from the auxiliary contact point 34 to one of opposite ends of the bottom arm 358 in the width direction. The inner arm 354 extends upward from a remaining one of the opposite ends of the bottom arm 358 in the width direction to the primary contact point 36. The primary contact point 36 is located at an upper end of the inner arm 354 and protrudes toward the auxiliary contact point 34 in the width direction. In other words, the auxiliary contact point 34 faces the primary contact point 36 in the width direction.

The first support portion 35 of the present embodiment has an easily bendable structure such as a long spring length. The primary contact point 36 of the present embodiment is movable in the upper-lower direction and the width direction. However, the present invention is not limited thereto. The structure of the first support portion 35 can be modified as necessary. The primary contact point 36 may be movable only in the width direction. For example, each of the outer arm 352, the bottom arm 358 and the inner arm 354 may have an arc-like shape in the YZ-plane. In this instance, the outer arm 352, the bottom arm 358 and the inner arm 354 may be smoothly connected to each other so that an arc is formed in the YZ-plane.

The second support portion 37 extends from the primary contact point 36 and extends away from the auxiliary contact point 34 in the width direction. The pressed portion 38 is provided on an end of the second support portion 37 in the width direction. The second support portion 37 is resiliently deformable. The pressed portion 38 is supported by the second support portion 37 and is movable mainly in the YZ-plane in accordance with a resilient deformation of the second support portion 37. The second support portion 37 of the present embodiment has an L-like shape and is resiliently deformed easily.

In detail, the second support portion 37 of the present embodiment has an upper end portion 371, a vertical arm 372 and a horizontal arm 374. The upper end portion 371 extends along the width direction from the primary contact point 36 and extends away from the auxiliary contact point 34 in the width direction. The vertical arm 372 extends downward from an end of the upper end portion 371 in the width direction. The horizontal arm 374 extends along the width direction from a lower end of the vertical arm 372 and extends away from the primary contact point 36 in the width direction. The pressed portion 38 is provided on the horizontal arm 374 and protrudes downward. The pressed portion 38 has a lower end which is located at a position same as that of a lower end of the lower end portion 31 in the upper-lower direction.

The vertical arm 372 of the present embodiment has a size HV in the upper-lower direction which is larger than another size WV thereof in the width direction. The horizontal arm 374 of the present embodiment has a size WH in the width direction which is larger than another size HH thereof in the upper-lower direction. According to the vertical arm 372 and the horizontal arm 374 formed as described above, a spring length of the second support portion 37 can be made long while a distance between the primary contact point 36 and the pressed portion 38 in the width direction is not made long. As a result, the terminal 30 can be reduced in size in the width direction while the second support portion 37 is improved in spring characteristics.

The second support portion 37 of the present embodiment has an easily bendable structure such as a long spring length. The pressed portion 38 of the present embodiment is movable in the upper-lower direction and the width direction. However, the present invention is not limited thereto. For example, the structure of the second support portion 37 can be modified as necessary. For example, the second support portion 37 may have only the vertical arm 372. In this instance, the pressed portion 38 may be provided on a lower end of the vertical arm 372.

Each of the terminals 30 of the present embodiment has the aforementioned structure. The auxiliary contact point 34 and the primary contact point 36 of each of the terminals 30 are parts which are configured to be electrically connected with the mating connector 62 (see FIG. 1). However, the present invention is not limited thereto. The structure of each of the terminals 30 can be modified as necessary, provided that each of the terminals 30 has the resiliently deformable first support portion 35, the primary contact point 36 supported by the first support portion 35, the resiliently deformable second support portion 37 and the pressed portion 38 supported by the second support portion 37. For example, the auxiliary contact point 34 may be provided as necessary.

Referring to FIG. 15, the additional terminals 40 of the present embodiment have shapes same as each other. Each of the additional terminals 40 is a single metal plate with bends. However, the present invention is not limited thereto. For example, the additional terminals 40 may have shapes different from each other. Each of the additional terminals 40 may be formed of a plurality of members joined together.

Hereafter, explanation will be made about a structure of one of the additional terminals 40 of the present embodiment. The explanation described below is applicable to each of the additional terminals 40.

Figure 17:
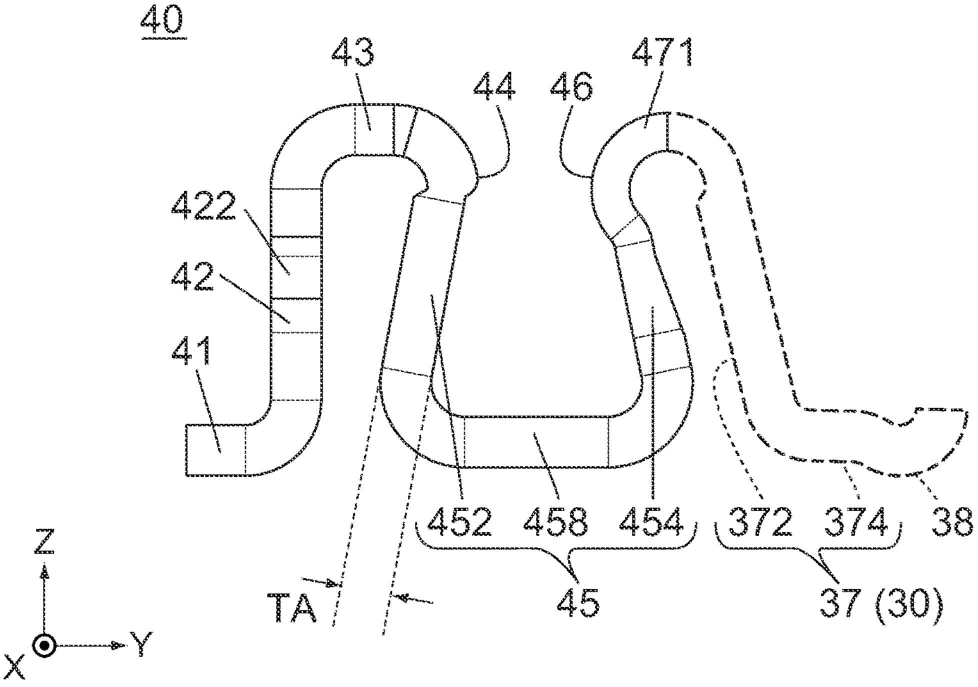
FIG. 17 is a side view showing one of the additional terminals of the terminal rows of FIG. 15, wherein a part of an outline of the terminal is illustrated with chain dotted lines.

Referring to FIG. 17, the additional terminal 40 of the present embodiment has a fixed portion 41, a held portion 42, a coupling portion 43, an auxiliary contact point 44, a first support portion 45, a primary contact point 46 and an upper end portion 471.

The fixed portion 41 is located at a lower end of the additional terminal 40 and extends along the width direction. The held portion 42 extends upward from an end of the fixed portion 41 in the width direction. The held portion 42 is formed with two press-fit projections 422 (see FIG. 15) which project outward from opposite sides of the held portion 42 in the pitch direction, respectively. The coupling portion 43 extends along the width direction from an upper end of the held portion 42 and extends away from the fixed portion 41 in the width direction. The auxiliary contact point 44 is provided on an end of the coupling portion 43 in the width direction. Thus, the coupling portion 43 couples the held portion 42 and the auxiliary contact point 44 to each other in the width direction. The auxiliary contact point 44 projects away from the fixed portion 41 in the width direction.

The first support portion 45 extends from the auxiliary contact point 44 and extends away from the fixed portion 41 in the width direction. The primary contact point 46 is provided on an end of the first support portion 45 in the width direction. The upper end portion 471 extends from the primary contact point 46 and extends away from the auxiliary contact point 44 in the width direction. The first support portion 45 is resiliently deformable. The primary contact point 46 is supported by the first support portion 45 and is movable mainly in the YZ-plane in accordance with a resilient deformation of the first support portion 45. The first support portion 45 of the present embodiment has a U-like shape and is resiliently deformed easily.

In detail, the first support portion 45 has an outer arm 452, a bottom arm 458 and an inner arm 454. The bottom arm 458 is located at a lower end of the first support portion 45 and extends along the width direction. The outer arm 452 extends downward from the auxiliary contact point 44 to one of opposite ends of the bottom arm 458 in the width direction. The inner arm 454 extends upward from a remaining one of the opposite ends of the bottom arm 458 in the width direction to the primary contact point 46. The primary contact point 46 is located at an upper end of the inner arm 454 and protrudes toward the auxiliary contact point 44 in the width direction. In other words, the auxiliary contact point 44 faces the primary contact point 46 in the width direction.

The first support portion 45 of the present embodiment has an easily bendable structure such as a long spring length. The primary contact point 46 of the present embodiment is movable in the upper-lower direction and the width direction. However, the present invention is not limited thereto. For example, the first support portion 45 may have a structure which is relatively resistant to deformation.

Comparing FIG. 17 with FIG. 16, the additional terminal 40 of the present embodiment has a structure similar to that of the terminal 30 except that the additional terminal 40 has the upper end portion 471 instead of the second support portion 37. Moreover, a thickness TC of the first support portion 35 of the terminal 30 is thinner than a thickness TA of the first support portion 45 of the additional terminal 40. The thus-formed first support portion 35 is more easily bendable than the first support portion 45. However, the present invention is not limited thereto. For example, the additional terminal 40 may have a shape same as that of the terminal 30 except for the difference that the additional terminal 40 has the upper end portion 471 instead of the second support portion 37.

Referring to FIG. 17, each of the additional terminals 40 of the present embodiment has the aforementioned structure. The auxiliary contact point 44 and the primary contact point 46 of each of the additional terminals 40 are parts which are configured to be electrically connected with the mating connector 62 (FIG. 1). However, the present invention is not limited thereto. For example, the auxiliary contact point 44 may be provided as necessary. As previously described, the additional terminals 40 may be provided as necessary.

Hereafter, explanation will be made about an arrangement of the terminals 30 and the additional terminals 40 of the present embodiment.

Referring to FIGS. 14 and 15, the terminals 30 and the additional terminals 40 of the present embodiment are divided into two terminal rows 16 in the width direction. In other words, the connector 12 comprises the two terminal rows 16. In each of the terminal rows 16, five of the terminals 30 and five of the additional terminals 40 are alternately arranged along the pitch direction. However, the present invention is not limited thereto. For example, the connector 12 may comprise only one of the terminal rows 16 or may comprise three or more of the terminal rows 16. Each of the terminal rows 16 may include only one of the terminals 30 and only one of the additional terminals 40. Thus, in each of the terminal rows 16, one or more of the terminals 30 and one or more of the additional terminals 40 may be alternately arranged along the pitch direction.

Figure 3:
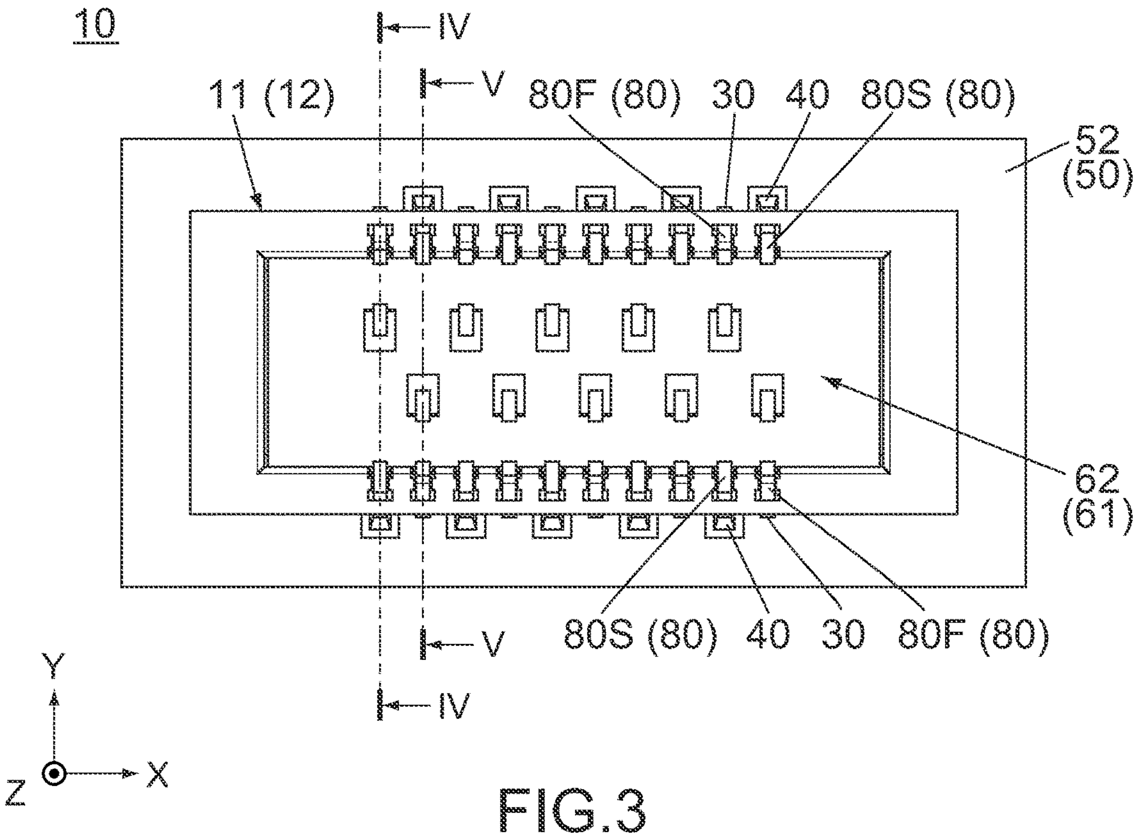
FIG. 3 is a plan view showing the connection device of FIG. 2.
Figure 11:
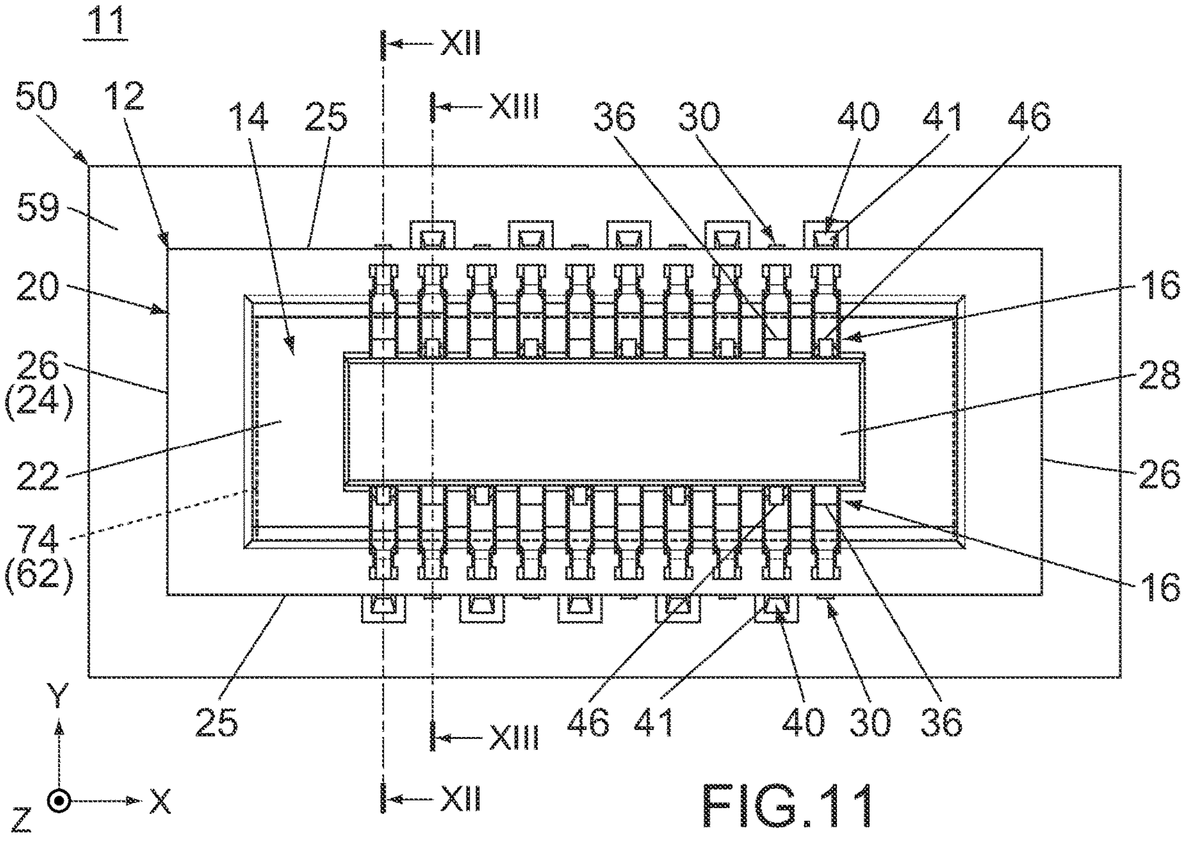
FIG. 11 is a plan view showing the assembly of the connection device of FIG. 1, wherein a part of an outline of the mating connector under the mated state is illustrated with dashed line.
Figure 18:
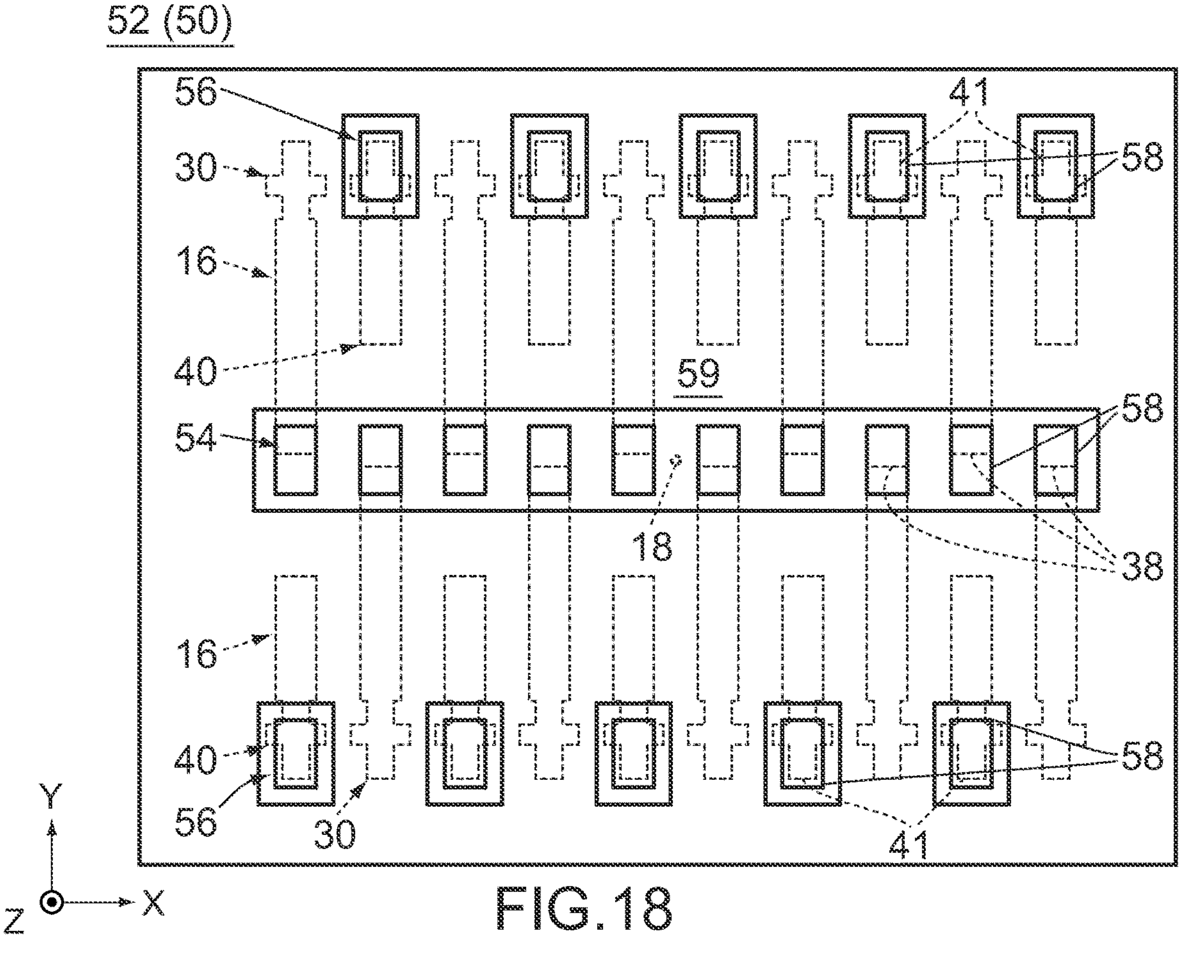
FIG. 18 is a plan view showing a part of a principal surface of the board of the assembly of FIG. 11, wherein outlines of the terminals and the additional terminals are illustrated with dashed line.
Figure 19:
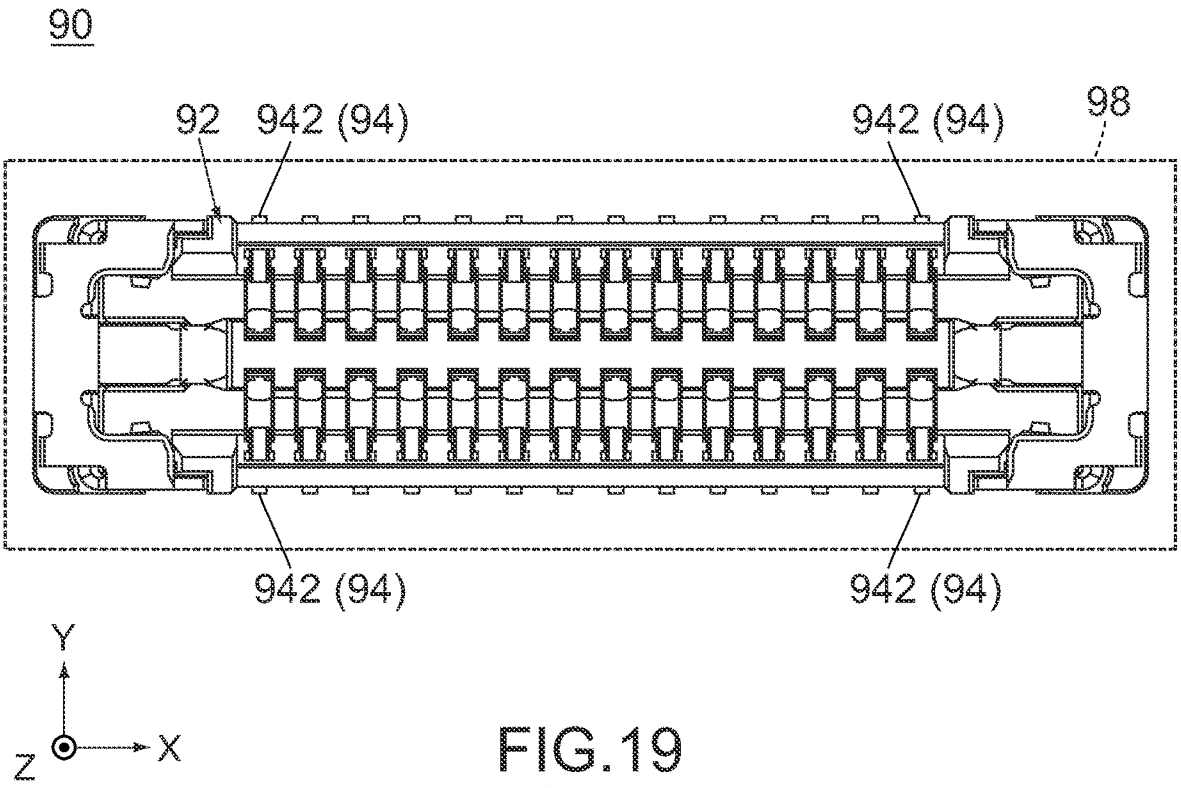
FIG.19 PRIOR ART
FIG. 19 is a plan view showing a connector of Patent Document 1, wherein an outline of a board on which the connector is mounted is illustrated with dashed line.

Referring to FIG. 11, the terminals 30 and the additional terminals 40 of the two terminal rows 16 of the present embodiment are arranged so that they have 2-fold rotational symmetry with respect to an axis in parallel to the upper-lower direction, or an axis extending along the upper-lower direction through the center 18 illustrated in FIG. 18. The terminals 30 of one of the terminal rows 16 and the additional terminals 40 of a remaining one of the terminal rows 16 are arranged side by side in the width direction, respectively. Referring to FIG. 3, the terminals 30 are located at positions which correspond to those of the first terminals 80F of the mating connector 62 in the XY-plane, respectively. The additional terminals 40 are located at positions which correspond to those of the second terminals 80S of the mating connector 62 in the XY-plane, respectively.

The terminals 30 and the additional terminals 40 of the present embodiment are arranged as described above. However, the arrangement of the terminals 30 and the additional terminals 40 of the present invention is not specifically limited. For example, the connector 12 and the mating connector 62 may comprise only one of the terminals 30 and only one of the first terminals 80F, respectively, which are located at positions corresponding to each other in the XY-plane.

Referring to FIGS. 14 and 15, the two terminal rows 16 of the present embodiment are attached to the two side portions 25, respectively, as described below.

Each of the side portions 25 of the present embodiment is formed with ten holding grooves 252. Thus, the holding member 20 is formed with two rows of the holding grooves 252. The holding grooves 252 of each row are arranged in a line in the pitch direction. Five of the holding grooves 252 of each row are parts which hold the terminals 30, respectively, and remaining five of the holding grooves 252 of each row are parts which hold the additional terminals 40, respectively. Each of the holding grooves 252 passes through the side portion 25 in the upper-lower direction and opens downward.

The holding member 20 of the present embodiment is formed with ten terminal receiving portions 29. The terminal receiving portions 29 are arranged in a line in the pitch direction. Each of the terminal receiving portions 29 passes through the bottom portion 22 in the upper-lower direction and opens downward. Each of the terminal receiving portions 29 extends between two of the holding grooves 252 in the width direction. Each of the terminal receiving portions 29 is partially located in the island-like portion 28 and is partially located under the receiving portion 14.

Each of the terminals 30 and the additional terminals 40 is inserted into the terminal receiving portion 29 from below. Each of the terminals 30 is partially received in the terminal receiving portion 29 and is adjacent to one of the additional terminals 40 in the width direction. In other words, each of the terminal receiving portions 29 receives one of the terminals 30 and one of the additional terminals 40. The held portion 32 of each of the terminals 30 is press-fit into and held by the corresponding holding groove 252. Similarly, the held portion 42 of each of the additional terminals 40 is press-fit into and held by the corresponding holding groove 252. Thus, the holding member 20 holds the terminals 30 and the additional terminals 40.

Figure 12:
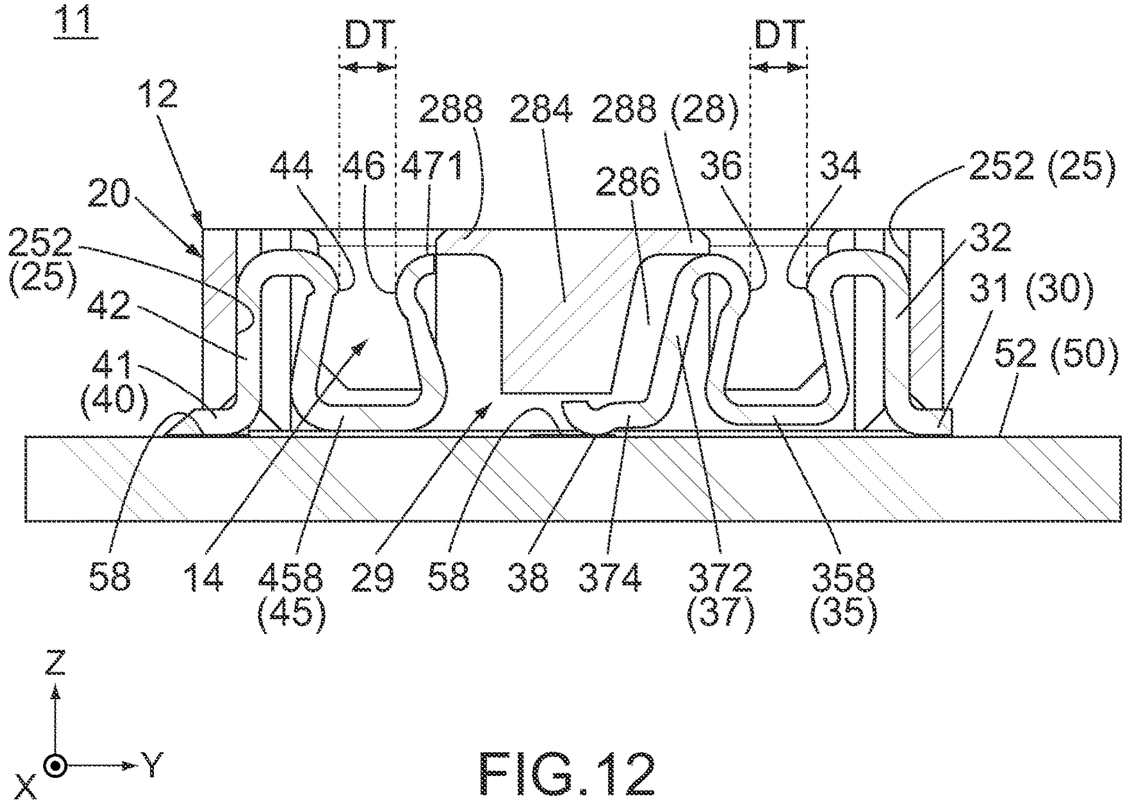
FIG. 12 is a cross-sectional view showing the assembly of FIG. 11, taken along line XII-XII.
Figure 13:
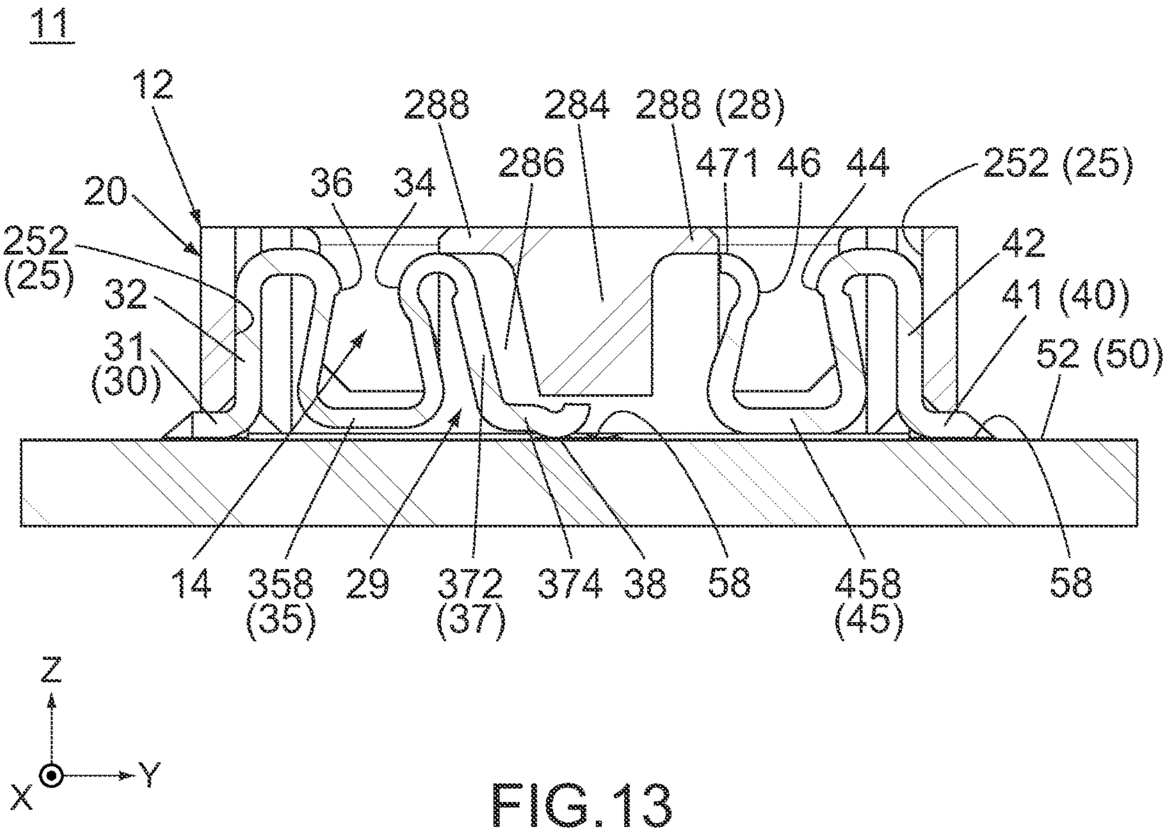
FIG. 13 is a cross-sectional view showing the assembly of FIG. 11, taken along line XIII-XIII.

The island-like portion 28 of the present embodiment is provided with ten middle walls 284 which correspond to the terminal receiving portions 29, respectively. The middle walls 284 are arranged in a line in the pitch direction. Referring to FIGS. 12 and 13, each of the middle walls 284 is located at the middle of the corresponding terminal receiving portion 29 in the width direction. In each of the terminal receiving portions 29, the terminal 30 and the additional terminal 40 are located at opposite sides, respectively, across the middle wall 284 in the width direction. In each of the terminal receiving portions 29, the pressed portion 38 of the terminal 30 is located under the middle wall 284.

Referring to FIG. 15, as described above, each of the terminals 30 and the additional terminals 40 of the present embodiment is press-fit into the holding member from below and is held by the holding member 20. When the terminals 30 and the additional terminals 40 are held by the holding member 20, the bottom arms 358 of the terminals 30 and the bottom arms 458 of the additional terminals 40 are exposed downward. However, the present invention is not limited thereto. For example, each of the terminals 30 and the additional terminals 40 may be insert-molded in the holding member 20 so that the holding member 20 holds them. In this instance, the holding grooves 252 do not need to be provided. Moreover, the terminal receiving portions 29 do not need to open downward. The middle walls 284 may be provided as necessary.

Referring to FIG. 12 together with FIG. 8, when the terminals 30 and the additional terminals 40 are held by the holding member 20, a distance DT between the auxiliary contact point 34 and the primary contact point 36 of each of the terminals 30 in the width direction is smaller than a size TT of the mating contact portion 84 of each of the first terminals 80F of the mating connector 62 in the width direction. The distance DT between the auxiliary contact point 44 and the primary contact point 46 of each of the additional terminals 40 in the width direction is smaller than the size TT of the mating contact portion 84 of each of the second terminals 80S of the mating connector 62 in the width direction.

Referring to FIG. 18 together with FIG. 11, when the terminals 30 are held by the holding member 20, the pressed portions 38 of all the terminals 30 are located at positions which are near to each other in the width direction. In other words, the pressed portions 38 are arranged substantially in a line in the pitch direction. When the additional terminals 40 are held by the holding member 20, the fixed portions 41 of the additional terminals 40 are divided into two rows in the width direction. The fixed portions 41 of each row are arranged in a line in the pitch direction.

Referring to FIG. 18, the principal surface 52 of the board 50 of the present embodiment is provided with two or more conductive pads 58 each made of conductor and a resist 59 made of insulator. The number of the conductive pads 58 of the present embodiment is twenty. The board 50 comprises one middle pad row 54 and two side pad rows 56 which correspond to the two terminal rows 16, respectively. In the middle pad row 54, two or more of the conductive pads 58 are arranged along the pitch direction. In the present embodiment, the number of the conductive pads 58 of the middle pad row 54 is ten. In each of the side pad rows 56, one or more of the conductive pads 58 are arranged along the pitch direction. In the present embodiment, the number of the conductive pads 58 of each of the side pad rows 56 is five. The middle pad row 54 is located between the two side pad rows 56 in the width direction.

When the connector 12 (see FIG. 11) is mounted on the principal surface 52, the additional terminals 40 of each of the terminal rows 16 are fixed on the conductive pads 58 of the corresponding side pad row 56, respectively. The fixed portion 41 of each of the additional terminals 40 of the present embodiment is fixed on and connected to the conductive pad 58 via soldering. As a result, the connector 12 is fixed on the board 50. The resist 59 surrounds the conductive pads 58 in the XY-plane and prevents the fixed portions 41 from being short-circuited upon soldering.

The board 50 of the present embodiment is a rigid circuit board having rigidity and has the aforementioned structure. However, the present invention is not limited thereto. For example, the board 50 may be an easily bendable FPC. In this instance, the board 50 may be reinforced by a reinforcement plate (not shown).

Referring to FIG. 14, according to the present embodiment, when the terminals 30 and the additional terminals 40 are held by the holding member 20, the lower ends of the lower end portions 31 and the lower ends of the pressed portions 38 of the terminals 30 are located at positions same as those of lower ends of the fixed portions 41 of the additional terminals 40 in the upper-lower direction. Referring to FIGS. 12 and 13 together with FIG. 18, according to this arrangement, under a state where the additional terminals 40 are fixed to the board 50, although no part of the terminals 30 is fixed to the board 50, the lower end portions 31 of the terminals 30 are in contact with the resist 59 of the board 50, and the pressed portions 38 are in contact with the conductive pads 58 of the middle pad row 54, respectively. As a result, the connector 12 is electrically connected with the board 50.

Referring to FIG. 11, according to the present embodiment, when the connector 12 is mounted on the principal surface 52, the additional terminals 40 are fixed on the principal surface 52 and thereby work as the fixation mechanism 40 which fixes the connector 12 to the board 50.

According to the present embodiment, the fixed portions 41 of the additional terminals 40 are located at opposite sides of the holding member 20 in the width direction and are arranged in regular interval between opposite sides of the holding member 20 in the pitch direction. According to this arrangement, the connector 12 can be firmly fixed to the board 50. However, the present invention is not limited thereto. For example, when the connector 12 has a small size, the connector 12 may comprise only one of the additional terminals 40. The connector 12 may comprise a holddown which works as the fixation mechanism 40 instead of the additional terminals 40 or in addition to the additional terminals 40. Moreover, the fixation mechanism 40 does not need to be a member held by the holding member 20. For example, the connector 12 may be fixed to the board 50 by another fixation mechanism 40 such as a screw.

Referring to FIG. 12, the pressed portion 38 of each of the terminals 30 of the present embodiment is arranged so that when the connector 12 is fixed to the board 50, the pressed portion 38 is in contact with the conductive pad 58 without being pressed against the conductive pad 58. The present embodiment is preferable from a viewpoint that the fixed portions 41 are easily soldered to the conductive pads 58 while the pressed portions 38 are in contact with the conductive pads 58. However, the present invention is not limited thereto. For example, in an instance where the fixation mechanism 40 is a screw, the pressed portions 38 may be pressed against the conductive pads 58 when the connector 12 is fixed to the board 50.

Hereafter, explanation will be made about a mating operation in which the connector 12 is mated with the mating connector 62 (see FIG. 1).

Referring to FIGS. 1 and 2, the connector 12 of the present embodiment is mateable with the mating connector 62 along the upper-lower direction under a state where the connector 12 is fixed to the board 50. However, the present invention is not limited thereto. For example, in an instance where the connector 12 does not comprise the additional terminals 40, the connector 12 may be fixed to the board 50 after being mated with the mating connector 62. In this instance, the board 50 and the mating board 66 may be fixed to each other by using a screw, for example. As can be seen from the explanation described above, the connector 12 of the present embodiment can be fixed to the board 50 by various fixation mechanisms 40 such as the additional terminal 40, a screw and a holddown.

Figure 4:
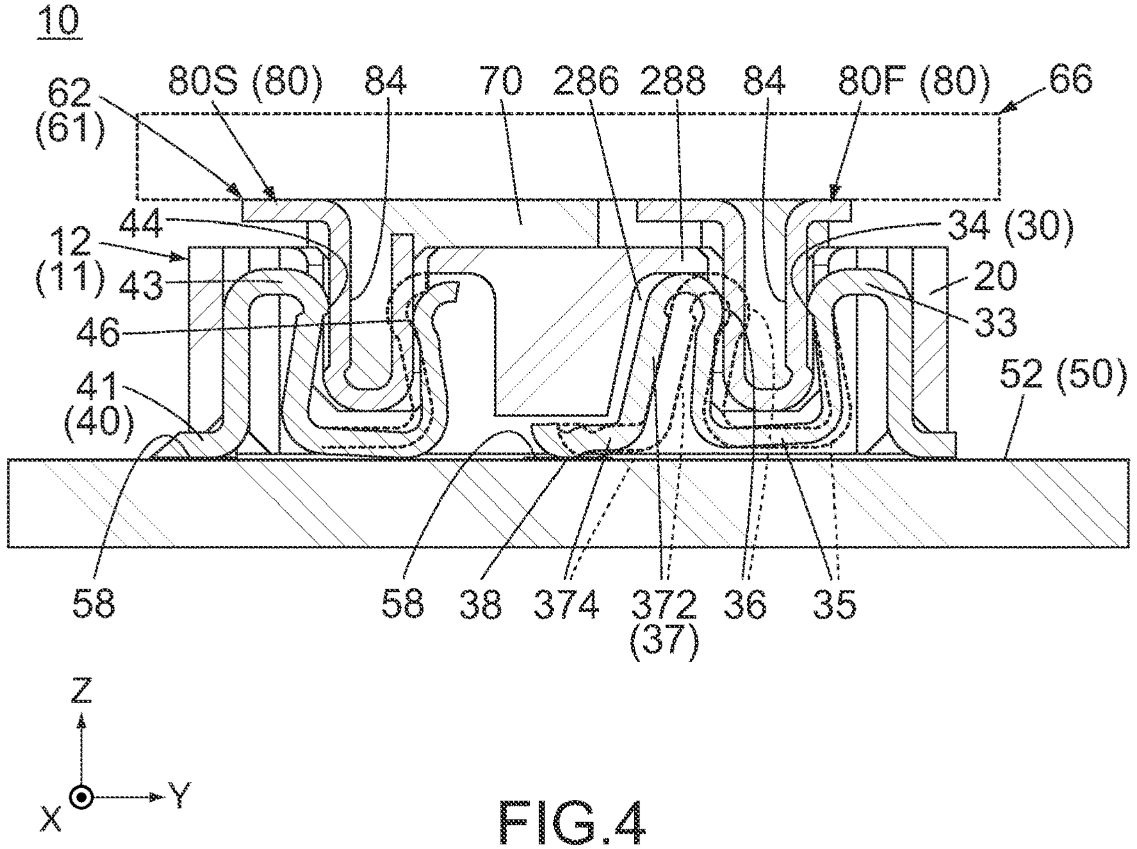
FIG. 4 is a cross-sectional view showing the connection device of FIG. 3, taken along line IV-IV, wherein an outline of the mating board, a part of an outline of a terminal under the separated state and a part of an outline of an additional terminal under the separated state are illustrated with dashed line.
Figure 5:
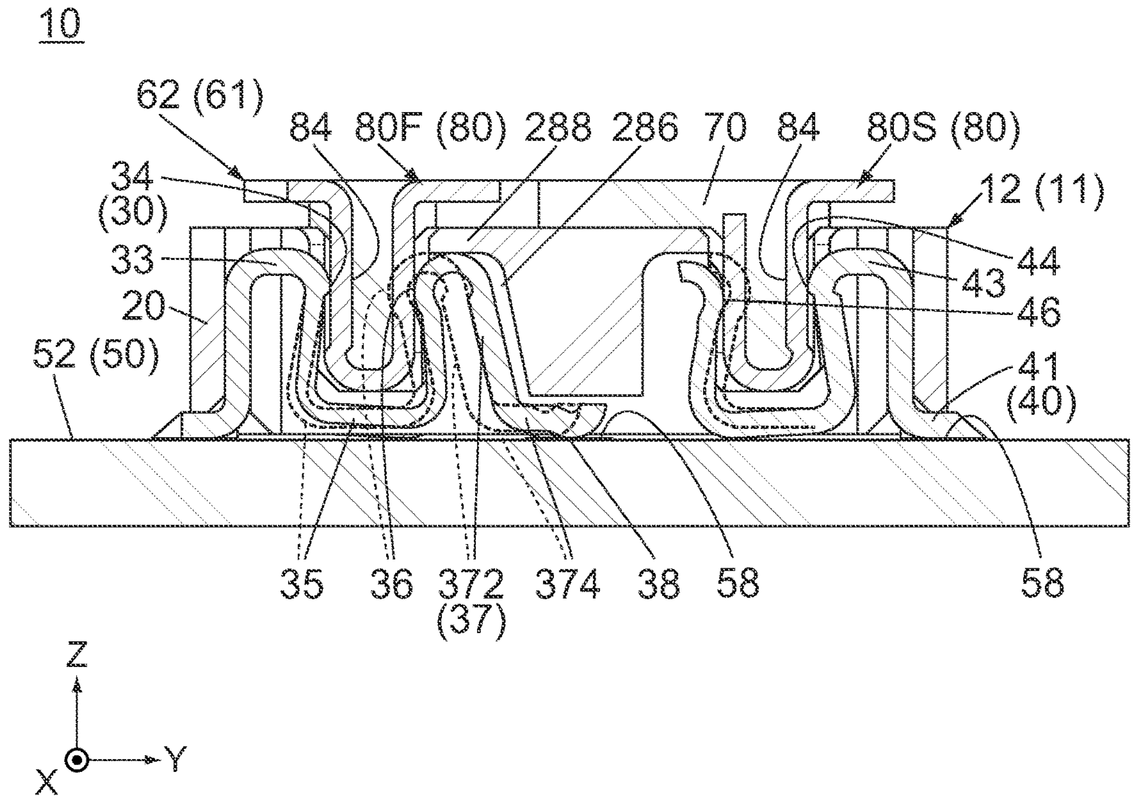
FIG. 5 is a cross-sectional view showing the connection device of FIG. 3, taken along line V-V, wherein a part of an outline of the terminal under the separated state and a part of an outline of the additional terminal under the separated state are illustrated with dashed line.

Referring to FIGS. 3, 7 and 11, in a process in which the connector 12 is mated with the mating connector 62, the island-like portion 28 of the connector 12 is received in the mating receiving portion 64 of the mating connector 62, and the peripheral wall 74 of the mating connector 62 is received in the receiving portion 14 of the connector 12. Referring to FIGS. 4 and 5, meanwhile, the mating contact portion 84 of each of the first terminals 80F is received between the auxiliary contact point 34 and the primary contact point 36 of the terminal 30 while pressing the primary contact point 36 and the auxiliary contact point 34 downward and outward in the width direction. Similarly, the mating contact portion 84 of each of the second terminals 80S is received between the auxiliary contact point 44 and the primary contact point 46 of the additional terminal 40 while pressing the primary contact point 46 and the auxiliary contact point 44 downward and outward in the width direction.

The auxiliary contact point 44 of each of the additional terminals 40 is close to the held portion 42 fixed to the holding member 20. The thus-arranged auxiliary contact point 44 is hardly moved even when pressed. In contrast, each of the primary contact points 46 is supported by the first support portion 45 having high spring characteristics. The thus-supported primary contact point 46 is moved downward and inward in the width direction. As a result, the bottom arm 458 of the first support portion 45 is pressed against the principal surface 52 of the board 50.

Similarly, the auxiliary contact point 34 of each of the terminals 30 is close to the held portion 32 fixed to the holding member 20. The thus-arranged auxiliary contact point 34 is hardly moved even when pressed. In contrast, each of the primary contact points 36 is supported by the inner arm 354 of the first support portion 35 having high spring characteristics. The thus-supported primary contact point 36 receives a force which is directed downward and inward in the width direction similarly to the force applied to the primary contact point 46 and is thereby moved in a turning direction. As a result, the pressed portion 38 is pressed against the conductive pad 58, and the primary contact point 36 is moved substantially only inward in the width direction.

As described above, when the connector 12 is mated with the mating connector 62, the primary contact point 36 of each of the terminals 30 is brought into contact with the mating terminal 80 and is moved in the width direction. Meanwhile, the second support portion 37 of each of the terminals 30 is resiliently deformed so that each of the pressed portions 38 is moved inward in the width direction while being pressed against the conductive pad 58. Therefore, when the connector 12 is mounted on the board 50 and is under a mated state where the connector 12 is mated with the mating connector 62, the pressed portions 38 are pressed against the conductive pads 58 in the upper-lower direction. If the board 50 is detached under the mated state, each of the pressed portions 38 is moved to a position located under another position where the conductive pad 58 has been located.

Referring to FIG. 18 together with FIG. 11, according to the present embodiment, when the connector 12 is under the mated state, the pressed portions 38 of the terminals 30 of the two terminal rows 16 are pressed against the conductive pads 58 of the middle pad row 54 in the upper-lower direction, respectively. As described above, each of the terminals 30 of the present embodiment is connected to the conductive pad 58 not by soldering but by being merely pressed against the conductive pad 58. According to this connection method, two of the conductive pads 58 adjacent to each other can be located at positions extremely close to each other, and thereby the terminals 30 can be arranged in a narrow pitch.

The present embodiment provides the assembly 11 which includes the connector 12 configured to be mounted on the board 50 and has a structure suitable to reduce the pitch between the terminals 30. By reducing the pitch between the terminals 30, the connector 12 can be reduced in size in the pitch direction. In addition, since a process in which the terminals 30 are soldered is unnecessary, the manufacturing cost of the assembly 11 can be reduced.

Referring to FIG. 11, because the terminals 30 and the additional terminals 40 of the present embodiment are alternately arranged in the pitch direction, the pressed portions 38 of the terminals 30 can be securely pressed against the conductive pads 58. However, the present invention is not limited thereto. For example, the arrangement of the terminals 30 and the additional terminals 40 in the pitch direction can be modified as necessary.

Comparing FIGS. 11 and 18 with FIGS. 7 and 10, the mating conductive pads 68 of the mating assembly 61 are arranged so that they are divided into four rows. Although this arrangement is effective to prevent short-circuit upon soldering, the size of the mating connector 62 is made large in the width direction. In contrast, according to the present embodiment, because the pitch between the pressed portions 38 can be made extremely short, the conductive pads 58 which are brought into contact with the pressed portions 38 can be arranged in one row along the pitch direction. Therefore, not only the size of the connector 12 in the pitch direction but also the size of the connector 12 in the width direction can be reduced. Thus, according to the present embodiment, an area occupied by the connector 12 on the principal surface 52 of the board 50 can be reduced.

Referring to FIGS. 4 and 5, according to the present embodiment, when the connector 12 is under the mated state, the primary contact point 36 and the auxiliary contact point 34 of each of the terminals 30 sandwich the mating terminal 80 therebetween in the width direction and are in contact with the mating terminal 80. Thus, each of the terminals 30 is in contact with two points of the mating terminal 80. According to this structure, even if the position of the mating connector 62 is displaced in the width direction, each of the terminals 30 can be stably in contact with the mating terminal 80 with a designed contact force. Moreover, because the pressed portions 38 are not fixed but can be moved in the width direction, further stable contact force can be obtained. Similarly, each of the additional terminals 40 can be stably in contact with two points of the mating terminal 80.

Each of the primary contact points 36 of the present embodiment is pressed in the width direction by the mating contact portion 84 which is sandwiched between the primary contact point 36 and the auxiliary contact point 34. However, the present invention is not limited thereto. For example, in an instance where the terminal 30 is not provided with the auxiliary contact point 34, a distance between the mating contact portion 84 of the first terminal 80F and the mating contact portion 84 of the second terminal 80S arranged in the width direction may be made shorter than another distance between the primary contact point 36 of the terminal 30 and the primary contact point 46 of the additional terminal 40 arranged in the width direction. Moreover, the mating contact portion 84 may be sandwiched between the primary contact point 36 and a part of the holding member 20. Similar modification can be applied to an instance where the additional terminal 40 is not provided with the auxiliary contact point 44.

According to the present embodiment, each of the horizontal arms 374 is located at the lower end of the second support portion 37. The-thus located horizontal arm 374 works as a spring which makes a contact force between the pressed portion 38 and the conductive pad 58 equal to or more than a predetermined value while the contact force of the primary contact point 36 are not affected. In addition, the springs of the horizontal arms 374 reduce variation of the contact forces between the pressed portions 38 and the conductive pads 58. However, the present invention is not limited thereto. For example, each of the horizontal arms 374 does not need to be provided on the lower end of the second support portion 37 but may be provided between the primary contact point 36 and the pressed portion 38. Moreover, the horizontal arms 374 may be provide as necessary.

Referring to FIG. 15, each of the terminal receiving portions 29 is provided with two regulation walls 286. Thus, the holding member 20 of the present embodiment has the regulation walls 286. Each of the regulation walls 286 of the present embodiment is an inner wall surface of the terminal receiving portion 29 and is a planar surface extending in parallel to the YZ-plane. The two regulation walls 286 of each of the terminal receiving portions 29 sandwich the terminal 30 and the additional terminal 40 therebetween in the pitch direction.

Referring to FIGS. 12 and 13, each of the regulation walls 286 extends between the two side portions 25 in the width direction. When the first support portion or the second support portion 37 of the terminal 30 is moved in the pitch direction, it is brought into abutment with the regulation wall 286. Thus, each of the regulation walls 286 of the present embodiment regulates a movement of the first support portion and the second support portion 37 in the pitch direction so that the primary contact point 36 and the pressed portion 38 are reliably moved in the width direction. Similarly, each of the regulation walls 286 regulates a movement of the first support portion 45 in the pitch direction so that the primary contact point 46 is reliably moved in the width direction. However, the present invention is not limited thereto. For example, each of the regulation walls 286 may regulate only the movement of the second support portion 37 in the pitch direction.

Each of the terminal receiving portions 29 is provided with two upper walls 288. Thus, the holding member 20 of the present embodiment has the upper walls 288. Each of the upper walls 288 of the present embodiment is an upper end portion of the island-like portion 28. Referring to FIGS. 4 and 5, when each of the second support portions 37 is resiliently deformed, the upper end of the second support portion 37 is pressed against the upper wall 288. When the connector 12 is under the mated state, each of the upper walls 288 presses the second support portion 37 downward. As a result, the contact force between each of the pressed portions 38 and the conductive pad 58 can be made sufficiently large. In addition, when the connector 12 is under the mated state, the upper walls 288 protect the ends of the additional terminals 40 from above. However, the present invention is not limited thereto. For example, the upper walls 288 may be provided as necessary.

What is claimed is:

1. An assembly comprising a board, a connector and a fixation mechanism, wherein:

the board has a principal surface;

the principal surface is provided with a conductive pad;

the connector is mountable on the principal surface and is fixable on the principal surface by the fixation mechanism;

the connector is mateable with a mating connector, which comprises a mating terminal, in an upper-lower direction intersecting with the principal surface;

the connector comprises a holding member and a terminal;

the holding member holds the terminal;

the terminal has a first support portion, a primary contact point, a second support portion and a pressed portion;

the first support portion is resiliently deformable;

the primary contact point is supported by the first support portion and is movable in a width direction perpendicular to the upper-lower direction;

when the connector is mated with the mating connector, the primary contact point is brought into contact with the mating terminal and is moved in the width direction;

the second support portion extends from the primary contact point and is resiliently deformable;

the pressed portion is supported by the second support portion and is movable in the upper-lower direction and the width direction; and when the connector is mounted on the board and is under a mated state where the connector is mated with the mating connector, the pressed portion is pressed against the conductive pad in the upper-lower direction.

2. The assembly as recited in claim 1, wherein:

the second support portion has a vertical arm and a horizontal arm;

the vertical arm has a size in the upper-lower direction which is larger than another size thereof in the width direction; and the horizontal arm has a size in the width direction which is larger than another size thereof in the upper-lower direction.

3. The assembly as recited in claim 1, wherein:

the holding member has a regulation wall; and the regulation wall regulates a movement of the second support portion in a direction perpendicular to both the upper-lower direction and the width direction.

4. The assembly as recited in claim 1, wherein:

the holding member has an upper wall; and when the connector is under the mated state, the upper wall presses the second support portion downward.

5. The assembly as recited in claim 1, wherein:

the terminal has an auxiliary contact point;

the auxiliary contact point faces the primary contact point in the width direction; and when the connector is under the mated state, the primary contact point and the auxiliary contact point sandwich the mating terminal therebetween and are in contact with the mating terminal.

6. The assembly as recited in claim 1, wherein:

the connector comprises an additional terminal;

the holding member holds the additional terminal; and when the connector is mounted on the principal surface, the additional terminal is fixed on the principal surface and works as the fixation mechanism.

7. The assembly as recited in claim 6, wherein:

the connector comprises two terminal rows;

in each of the terminal rows, one or more of the terminals and one or more of the additional terminals are alternately arranged along a pitch direction perpendicular to both the upper-lower direction and the width direction;

the terminals and the additional terminals of the two terminal rows are arranged so that they have 2-fold rotational symmetry with respect to an axis in parallel to the upper-lower direction;

the board comprises one middle pad row and two side pad rows which correspond to the terminal rows, respectively;

in the middle pad row, two or more of the conductive pads are arranged along the pitch direction;

in each of the side pad rows, one or more of the conductive pads are arranged along the pitch direction;

the middle pad row is located between the two side pad rows in the width direction;

when the connector is mounted on the principal surface, the additional terminals of each of the terminal rows are fixed on the conductive pads of a corresponding one of the side pad rows, respectively; and when the connector is under the mated state, the pressed portions of the terminals of the two terminal rows are pressed against the conductive pads of the middle pad row in the upper-lower direction, respectively.

8. A connector mateable with a mating connector, which comprises a mating terminal, in an upper-lower direction intersecting with a board on which the connector is mountable, wherein:

the connector comprises a holding member and a terminal;

the holding member holds the terminal;

the terminal has a first support portion, a primary contact point, a second support portion and a pressed portion;

the first support portion is resiliently deformable;

the primary contact point is supported by the first support portion and is movable in a width direction perpendicular to the upper-lower direction;

when the connector is mated with the mating connector, the primary contact point is brought into contact with the mating terminal and is moved in the width direction;

the second support portion extends from the primary contact point and is resiliently deformable;

the pressed portion is supported by the second support portion and is movable in the upper-lower direction and the width direction; and when the connector is mounted on the board and is under a mated state where the connector is mated with the mating connector, the pressed portion is pressed against the board in the upper-lower direction.

* * * * *